United States Patent
Hui et al.

(10) Patent No.: US 10,827,530 B2
(45) Date of Patent: Nov. 3, 2020

(54) METHOD FOR TRANSMITTING AND RECEIVING MESSAGE FOR RANDOM ACCESS IN MULTI BEAM SYSTEM

(71) Applicant: ELECTRONICS AND TELECOMMUNICATIONS RESEARCH INSTITUTE, Daejeon (KR)

(72) Inventors: Bing Hui, Daejeon (KR); Il Gyu Kim, Chungcheongbuk-do (KR); Junhyeong Kim, Daejeon (KR); Gosan Noh, Daejeon (KR); Hee Sang Chung, Daejeon (KR); Sung Woo Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/971,301

(22) Filed: May 4, 2018

(65) Prior Publication Data

US 2018/0324865 A1 Nov. 8, 2018

(30) Foreign Application Priority Data

May 4, 2017 (KR) .................. 10-2017-0056793
Jun. 8, 2017 (KR) .................. 10-2017-0071821
(Continued)

(51) Int. Cl.
*H04W 74/08* (2009.01)
*H04B 7/06* (2006.01)
(Continued)

(52) U.S. Cl.
CPC ...... *H04W 74/0833* (2013.01); *H04B 7/0617* (2013.01); *H04B 7/0695* (2013.01);
(Continued)

(58) Field of Classification Search
CPC ......... H04W 74/0833; H04W 74/0891; H04W 74/006; H04W 74/004; H04B 7/088; H04B 7/0695; H04B 7/0617
See application file for complete search history.

(56) References Cited

U.S. PATENT DOCUMENTS 8,731,555 B2    5/2014  Yokoyama
2014/0120926 A1 5/2014  Shin et al.
(Continued)

FOREIGN PATENT DOCUMENTS

EP    2309817 A1   4/2011
JP    5588594 B2   9/2014
(Continued)

OTHER PUBLICATIONS

"RAN1 Chairman's Notes", 3GPP TSG RAN WG1 Meeting #88bis, Spokane, USA, Apr. 2017.
(Continued)

*Primary Examiner* — Shailendra Kumar
(74) *Attorney, Agent, or Firm* — LRK Patent Law Firm

(57) ABSTRACT

A method for transmitting and receiving a message for a random access (RA) between user equipment (UE) and a base station in a multi beam system includes: transmitting a synchronization signal (SS) block including a synchronization signal by performing beam sweeping for a multi beam; receiving a message 1 of an RA procedure from the UE; determining an optimal transmission beam to be used to transmit a message 2 of the RA procedure based on information about an association mapping between the SS block and a physical random access channel (PRACH) which is
(Continued)

used to transmit the message 1; and transmitting the message 2 by using the optimal transmission beam.

17 Claims, 22 Drawing Sheets

(30) Foreign Application Priority Data

May 4, 2018 (KR) .......................... 10-2018-0052060
May 4, 2018 (KR) .......................... 10-2018-0052062

(51) Int. Cl.
*H04W 74/00* (2009.01)
*H04B 7/08* (2006.01)

(52) U.S. Cl.
CPC .......... *H04B 7/088* (2013.01); *H04W 74/004* (2013.01); *H04W 74/006* (2013.01); *H04W 74/0891* (2013.01)

(56) References Cited

U.S. PATENT DOCUMENTS

| | | | |
|---|---|---|---|
| 2014/0153423 A1 | 6/2014 | Shin et al. | |
| 2016/0192398 A1* | 6/2016 | Wang | H04W 74/0833 370/329 |
| 2016/0192400 A1 | 6/2016 | Sohn et al. | |
| 2016/0227575 A1* | 8/2016 | Furuskog | H04W 72/1294 |
| 2016/0278127 A1 | 9/2016 | Sunell et al. | |
| 2016/0323757 A1 | 11/2016 | Braun et al. | |
| 2017/0251460 A1* | 8/2017 | Agiwal | H04W 72/0406 |
| 2018/0279380 A1* | 9/2018 | Jung | H04W 74/0833 |
| 2018/0343595 A1* | 11/2018 | da Silva | H04J 11/0073 |
| 2019/0150096 A1* | 5/2019 | Lee | H04W 36/00 370/331 |
| 2019/0254078 A1* | 8/2019 | Zhang | H04L 1/16 |
| 2019/0335474 A1* | 10/2019 | Tang | H04L 5/005 |

FOREIGN PATENT DOCUMENTS

| | | |
|---|---|---|
| JP | 2015-041818 A | 3/2015 |
| WO | 2005/022792 A2 | 3/2005 |

OTHER PUBLICATIONS

"3rd Generation Partnership Project; Technical Specification Group Radio Access Network; Study on New Radio (NR) Access Technology; Physical Layer Aspects (Release 14)", 3GPP TR 38.802 V2.0.0, Mar. 2017.
"RAN1 Chairman's Notes", 3GPP TSG RAN WG1 Meeting #89, Hangzhou, P.R. China, May 2017.
"Report of #GPP TSG RAN2 meeting #97bis, Spokane, USA", 3GPP TSG-RAN WG2 meeting #98, R2-1704001, Hangzhou, China, May 2017.
"NR-PRACH for various use cases", ETRI, 3GPP TSG RAN WG1 NR Ad-Hoc#2, R1-1710610, Qingdao, P.R. China, Jun. 2017.

* cited by examiner

FIG. 12

Category 1 to Conventional PRACH mapping

| Conventional PRACH | ... ... | PRACH resources (i-1) | PRACH resources i | PRACH resources (i+1) | ... ... |
|---|---|---|---|---|---|

← SS Block to PRACH resource association
← CSI-RS to PRACH resource association

Category 2 to New PRACH mapping

| New PRACH 1 | ... ... | PRACH resources (j-1) | PRACH resources j | PRACH resources (j+1) | ... ... |
|---|---|---|---|---|---|

← SS Block to PRACH resource association
← CSI-RS to PRACH resource association

FIG. 13
Category 1 to Conventional PRACH mapping
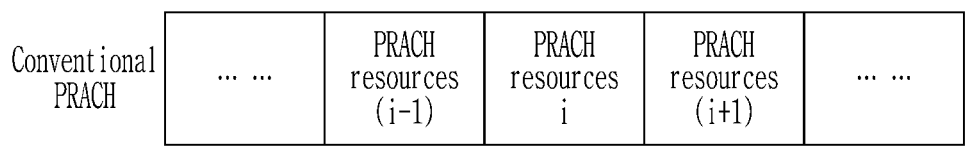
← SS Block to PRACH resource association
← CSI-RS to PRACH resource association
Category 2 to New PRACH mapping
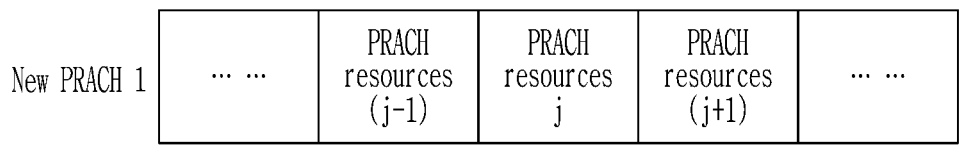
← SS Block to PRACH resource association
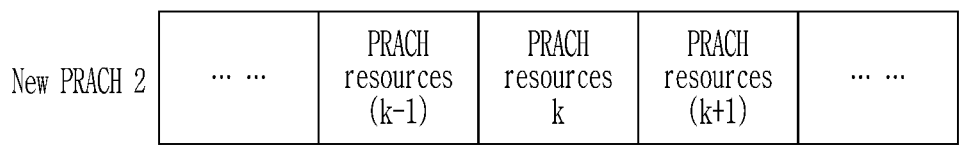
← CSI-RS to PRACH resource association

FIG. 14

Category 1 to New PRACH 1 mapping

| New PRACH 1 | ... ... | PRACH resources (i-1) | PRACH resources i | PRACH resources (i+1) | ... ... |
|---|---|---|---|---|---|

← SS Block to PRACH resource association

Category 2 to New PRACH 2 mapping

| New PRACH 2 | ... ... | PRACH resources (j-1) | PRACH resources j | PRACH resources (j+1) | ... ... |
|---|---|---|---|---|---|

← CSI-RS to PRACH resource association

FIG. 15
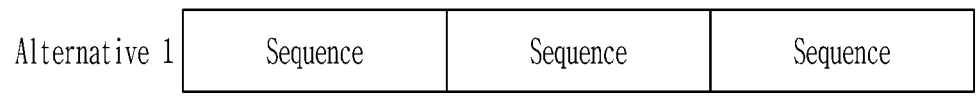
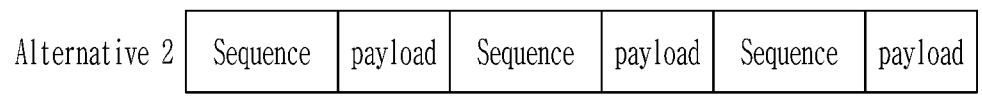

METHOD FOR TRANSMITTING AND RECEIVING MESSAGE FOR RANDOM ACCESS IN MULTI BEAM SYSTEM

CROSS-REFERENCE TO RELATED APPLICATIONS

This application claims priority to and the benefit of Korean Patent Applications Nos. 10-2017-0056793, 10-2017-0071821, 10-2018-0052060, and 10-2018-0052062, filed in the Korean Intellectual Property Office on May 4, 2017, Jun. 8, 2017, May 4, 2018, and May 4, 2018, respectively, the entire contents of which are incorporated herein by reference.

BACKGROUND OF THE INVENTION

1. Field of the Invention

The present invention relates to a method for transmitting and receiving a random access message in a multi-beam system.

2. Description of Related Art

The work item (WI) of the 3GPP NR (new radio) regulation is targeting to design a NR system fulfilling 5G requirements. In 3GPP NR, multi-beam operations based on a hybrid beamforming are adopted to enhance the system performance.

SUMMARY OF THE INVENTION

An exemplary embodiment provides a method for transmitting and receiving messages for a random access with user equipment by a base station.

Another exemplary embodiment provides a method for transmitting and receiving messages for a random access with a base station by user equipment.

Yet another exemplary embodiment provides a method for transmitting and receiving messages for a random access with user equipment by a base station.

An exemplary embodiment provides a method for transmitting and receiving a message for a random access (RA) with user equipment (UE) by a base station in a multi beam system, comprising: transmitting a synchronization signal (SS) block including a synchronization signal by performing beam sweeping for a multi beam; receiving a message 1 of an RA procedure from the UE; determining an optimal transmission beam to be used to transmit a message 2 of the RA procedure based on information about an association mapping between the SS block and a physical random access channel (PRACH) which is used to transmit the message 1; and transmitting the message 2 by using the optimal transmission beam.

The receiving of the message 1 may include calibrating a reception beam of the base station after successfully receiving the message 1 by performing reception beam sweeping.

The multi beam used to transmit the SS block and the optimal transmission beam may be a wide transmission beam.

The method may further include: transmitting a signal for a fine calibration of a transmission beam to the UE; and receiving information, through a message 3 of the RA procedure, about the optimal transmission beam determined based on a measurement result of the signal for the fine calibration.

The information about the optimal transmission beam may be included in a payload added to the message 3 or is included a physical uplink shared channel (PUSCH).

The SS block may include a time index indication corresponding to index information of the multi beam.

The SS block may be mapped 1:1 with the PRACH resource in the association mapping.

The SS block may be mapped with a plurality of PRACH resources in the association mapping.

Another exemplary embodiment provides a method for transmitting and receiving a message for a random access (RA) with a base station by user equipment in a multi beam system, comprising: receiving a synchronization signal (SS) block including a synchronization signal from the multi beam of the base station; determining a physical random access channel (PRACH) resource through which a message 1 of a RA procedure is transmitted based on information about an association mapping between the SS block and the PRACH resource; and transmitting the message 1 to the base station by using the determined PRACH resource.

The multi beam used to transmit the SS block may be a wide transmission beam.

The method may further include: receiving a signal for a fine calibration of a transmission beam of the base station from the base station; determining information about an optimal transmission beam of the base station based on a measurement result of the signal for the fine calibration; and transmitting the information about the optimal transmission beam through a message 3 of the RA procedure.

The transmitting the information about the optimal transmission beam may include transmitting the information about the optimal transmission beam by using a payload added to the message 3 or by using a physical uplink shared channel (PUSCH).

The method may further include: determining index information of a transmission beam of the base station based on a time index indication included in the SS block.

The SS block may be mapped 1:1 with the PRACH resource in the association mapping.

The SS block may be mapped with a plurality of PRACH resources in the association mapping.

Yet Another exemplary embodiment provides a method for transmitting and receiving a message for a random access (RA) with user equipment (UE) by a base station in a multi beam system, comprising: transmitting a synchronization signal (SS) block including a synchronization signal by performing beam sweeping for a multi beam; receiving a message 1 of an RA procedure from the UE; determining an optimal transmission beam to be used to transmit a message 2 of the RA procedure based on information about an association mapping between the SS block and a preamble index of a preamble included in the message 1; and transmitting the message 2 by using the optimal transmission beam.

The preamble may be transmitted through the same physical random access channel (PRACH) resource or different PRACH resource.

The preamble may be transmitted through all available physical random access channel (PRACH) resource.

The preamble may be an orthogonally coded preamble.

The SS block may be mapped with the preamble and physical random access channel (PRACH) resource, and the receiving of the message 1 comprises receiving the message 1 including the preamble through the PRACH resource.

BRIEF DESCRIPTION OF THE DRAWINGS

FIG. 12 is a schematic diagram illustrating a mapping between a same new PRACH and a use case according to an exemplary embodiment;

FIG. 13 is a schematic diagram illustrating a mapping between a use case and a new PRACH different from each other according to an exemplary embodiment;

FIG. 14 is a schematic diagram illustrating a new PRACH according to an exemplary embodiment;

FIG. 15 is a schematic diagram illustrating a message 1 format including 3 PRACH resources for BFR request according to an exemplary embodiment;

DETAILED DESCRIPTION OF THE EMBODIMENTS

Figure 1:
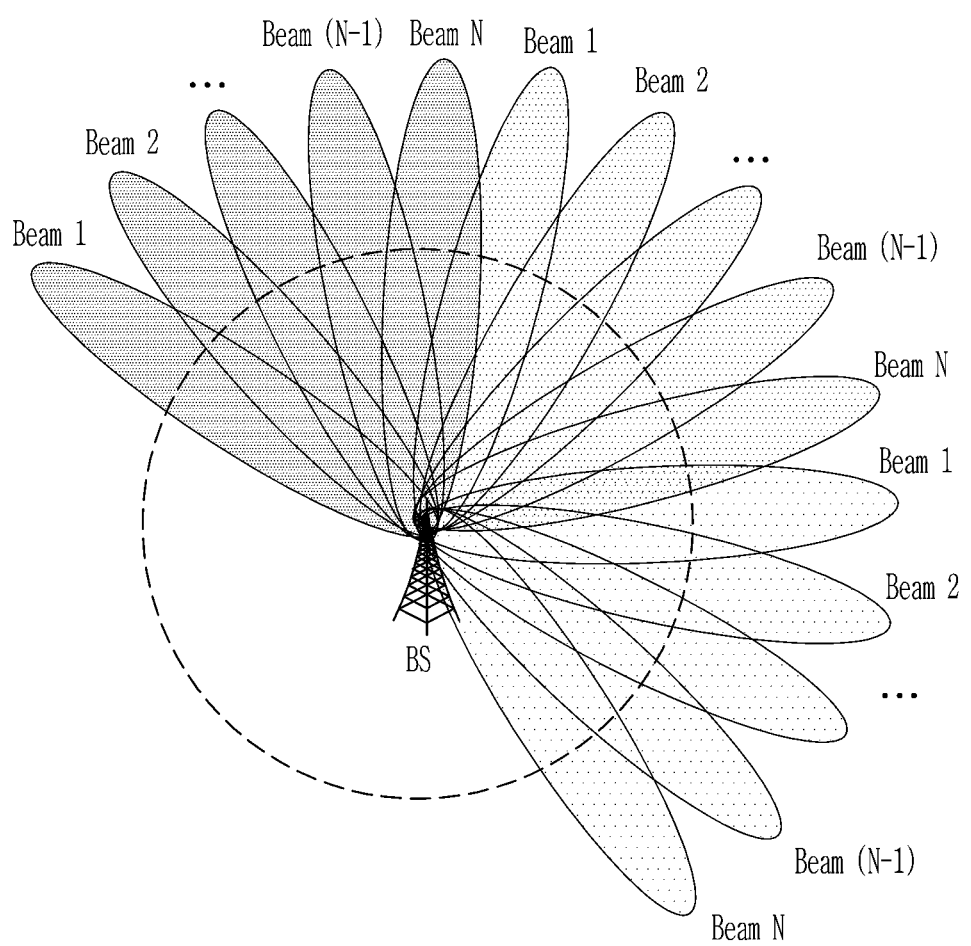
FIG. 1 is a schematic diagram illustrating a multi-beam pattern of a base station according to an exemplary embodiment.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

Throughout the specification, user equipment (UE) may be called a terminal, a mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTC device, and the like.

Further, a gNodeB (base station) may refer to a base station (BS), an advanced base station (ABS), a high reliability base station (HR-BS), a node B, an evolved node B (eNB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femoto BS), a home node B (HNB), a home eNodeB (HeNB), a pico base station (pico BS), a macro base station (macro BS), a micro base station (micro BS), and the like), and the like and may also include all or some of the functions of the ABS, the HR-BS, the node B, the eNodeB, the AP, the RAS, the BTS, the MMR-BS, the RS, the RN, the ARS, the HR-RS, the small base stations, and the like.

Figure 2:
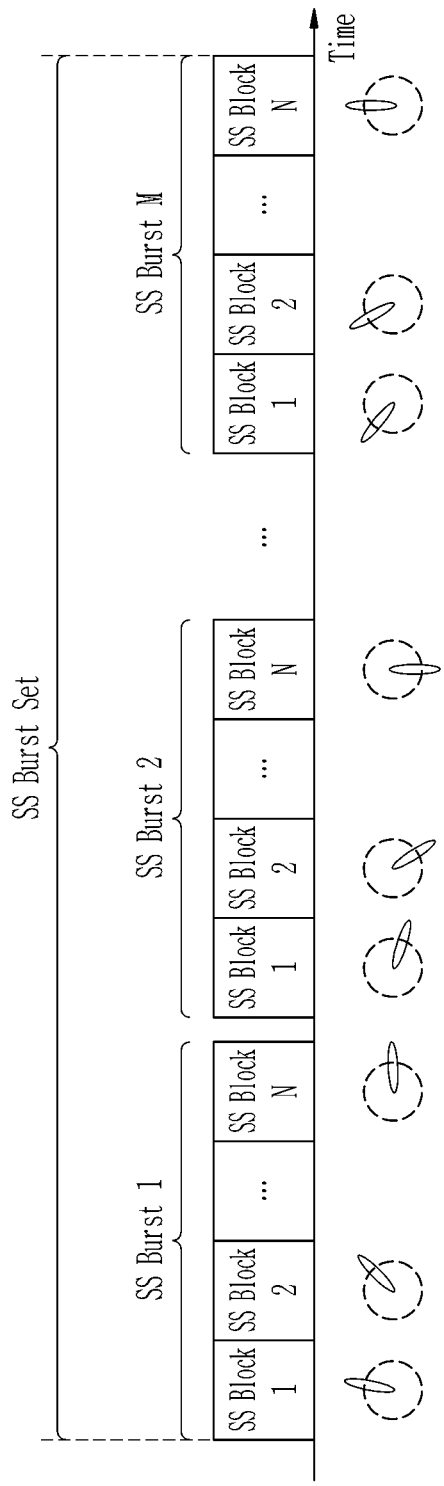
FIG. 2 is a schematic diagram illustrating a structure of a synchronization signal according to an exemplary embodiment.

FIG. 1 is a schematic diagram illustrating a multi-beam pattern of a base station according to an exemplary embodiment, and FIG. 2 is a schematic diagram illustrating a structure of a synchronization signal according to an exemplary embodiment.

Referring to FIG. 1, a base station of 5G NR uses a multi-beam pattern based on a beam group including N beams. Referring to FIG. 2, a synchronization signal (SS) structure of the 5G NR is represented by an SS burst set, and the SS burst set includes one or more SS bursts. A SS block included in each SS burst corresponds to one SS beam having inherent directivity. That is, since beam sweeping is based on hybrid beamforming, each SS burst included in the SS burst set includes a plurality of SS blocks corresponding to the beams having different directivities in the time domain. The SS burst of FIG. 2 may be regarded as corresponding to the beam group of FIG. 1. The SS structure of FIG. 2 may be suitable for both single beam operation and multi-beam operation. The parameters related to the SS and the physical broadcast channel (PBCH) may also satisfy the following conditions.

The period of the SS burst set is 20 ms.

The PBCH may be transmitted in each SS block.

In a multi-beam random access (RA), there is an association between the SS block and a physical random access channel (PRACH) resource.

According to an exemplary embodiment, an association mapping relationship between the SS block and the PRACH is provided, and a new 4-step RA procedure in multi-beam operation is provided in this regard.

A single beam operation is treated as a special case of a multi-beam operation, and the exemplary embodiments described below taking multi-beam operation as an example may be applied to the single beam operation. Below, after searching for the SS block from the base station (or the transmit/receive point (TRP) of the 3GPP NR, etc.), the user equipment (UE) may perform a 4-step RA procedure in which the message is used. First, the mapping between the SS block and the PRACH resource will be described.

Figure 3:
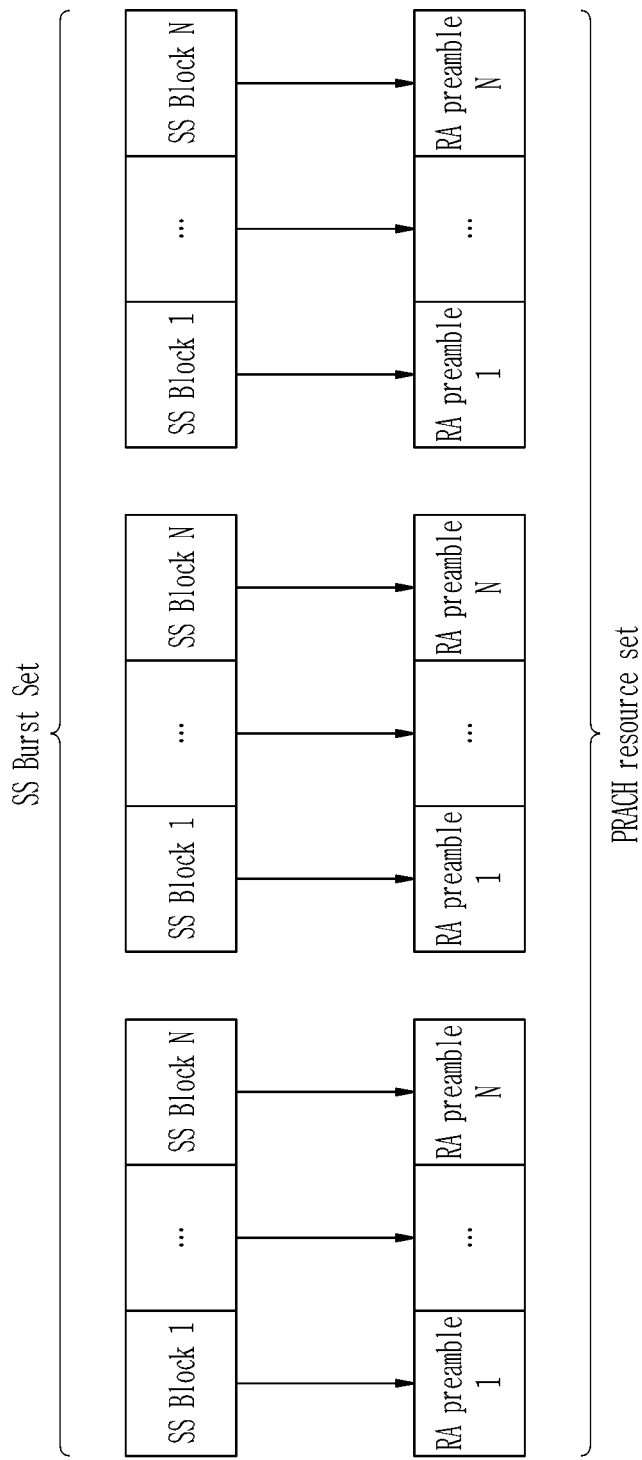
FIG. 3 is a diagram illustrating an association mapping between the SS burst set and the RA preamble resource in a PRACH resource according to an exemplary embodiment.
Figure 4:
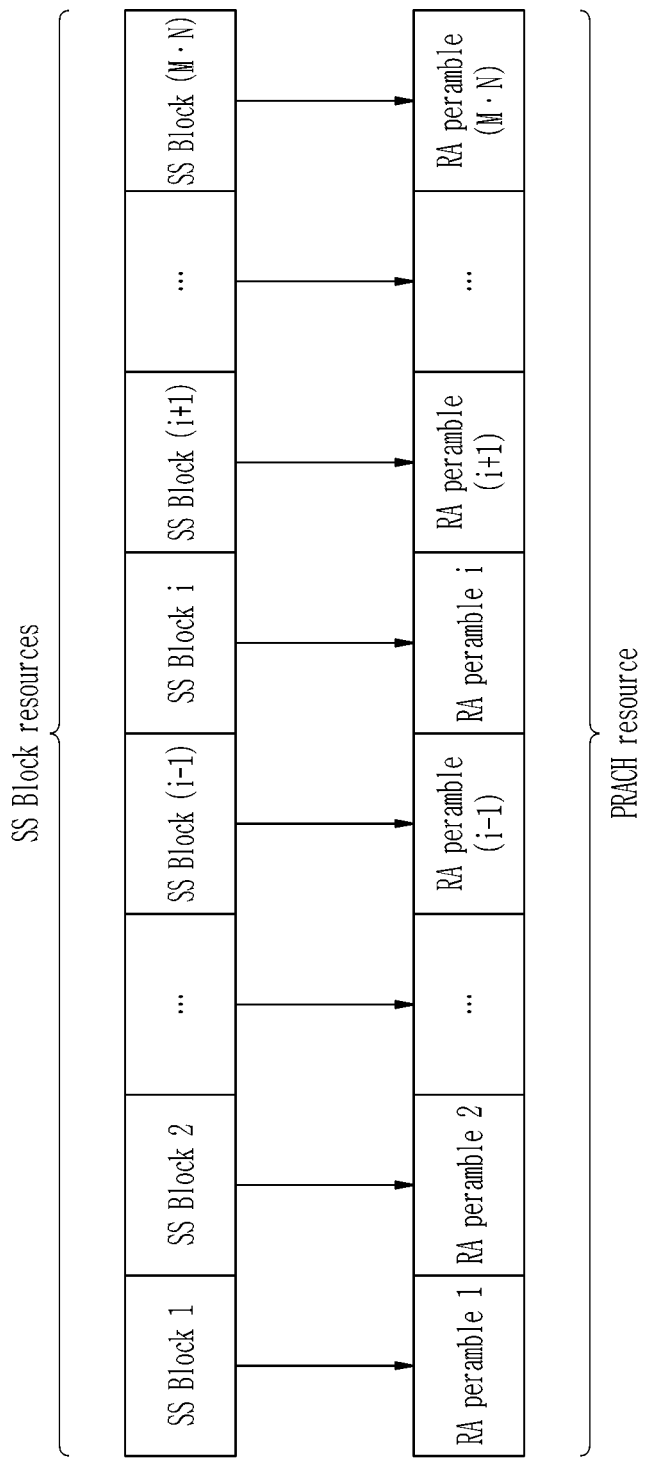
FIG. 4 is a diagram illustrating a mapping association between the SS burst set and a RA preamble resource in the PRACH resource according to another exemplary embodiment.
Figure 5:
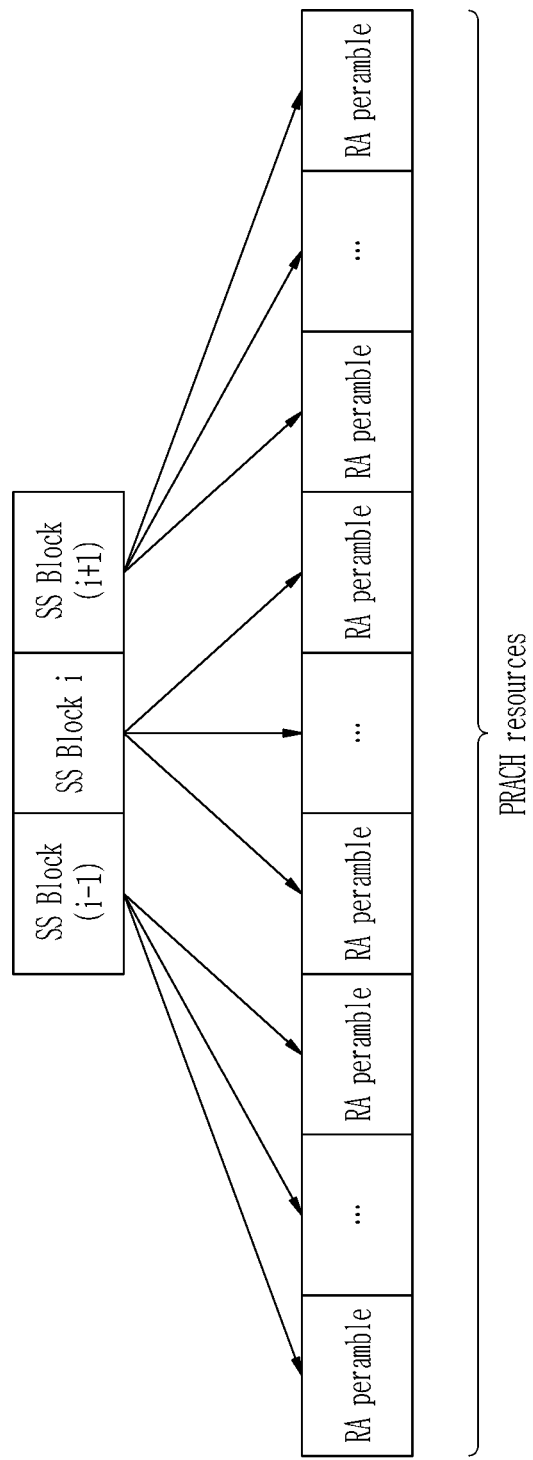
FIG. 5 is a diagram illustrating a joint mapping between the SS burst set and the RA preamble resource in the PRACH resource according to yet another exemplary embodiment.

FIG. 3 is a diagram illustrating an association mapping between the SS burst set and the RA preamble resource in a PRACH resource according to an exemplary embodiment, FIG. 4 is a diagram illustrating a mapping association between the SS burst set and a RA preamble resource in the PRACH resource according to another exemplary embodiment, and FIG. 5 is a diagram illustrating a joint mapping between the SS burst set and the RA preamble resource in the PRACH resource according to yet another exemplary embodiment.

The PRACH resources shown in FIGS. 3 to 5 may represent time/frequency resources. In the association mapping shown in FIGS. 3 to 5, a scenario in which the base station transmits a beam group as shown in FIG. 1 is assumed. In FIG. 1, the base station transmits a downlink using M beam groups, where each of the beam group includes N beams. Also, the base station receives the uplink using m beam groups, where each of the beam group includes n beams. At this time, total number of transmission (Tx) beams of the base station is M*N, and total number of reception (Rx) beams is m*n. FIG. 1 illustrates directions of Tx beams of the base station and directions of Rx beams. The direction of the Tx beams and the direction of the Rx beams at the base station may be different from each other, and the number of Tx beams and the number of Rx beams may also be different from each other.

Association mapping 1: Referring to FIG. 3 and FIG. 4, the SS block and the PRACH resources are mapped to 1:1. In the association mapping 1, according to an exemplary embodiment, one SS block in the SS burst set is mapped to one PRACH resource. Therefore, the preamble sequence of the PRACH resource may be transmitted by the terminal in correspondence with one beam direction. In FIG. 1, the Tx beams of the base station have M*N narrow beams, and the number of Rx beams of the base station may be equal to the number of Tx beams. According to FIG. 3, M SS block groups (each SS block group includes N SS blocks) included in the SS burst set may be distributed in the time domain. That is, each SS block group is spaced from the time domain. In addition, M PRACH resource groups (each PRACH resource group includes N PRACH resources) may also be distributed in the time domain. In FIG. 3, each SS burst is mapped to one RA preamble in one PRACH resource. Alternatively, the M SS block groups included in the SS burst set may be continued in the time domain. That is, if the beam of the base station is not grouped (i.e., the base station does not have a beam group), the plurality of SS blocks (or SS block groups) may be 1:1 mapped in succession with a plurality of preambles in one PRACH resource. Referring to FIG. 4, one SS burst is mapped to one PRACH resource having a plurality of preamble indexes.

Association mapping 2: In general, in the base station, the number of Tx beam groups may be different from the number of Rx beam groups. For example, when the periodicity of the SS burst set is 20 ms, the total number of beams transmitted from the base station side is quite large number in a high frequency band (for example, 70 GHz band) such as a millimeter wave (mmWave) frequency band, 1:1 mapping as shown in FIG. 3 may be difficult considering the radio frequency efficiency of the SS block. That is, the total number of SS blocks in the SS burst set may be less than the number of PRACH resources (which may be the same as the Rx beam direction of the base station). Thus, referring to FIG. 5, in the association mapping 2, one SS block may be mapped to a plurality of PRACH resources. The association mapping 2 shown in FIG. 5 may be applied irrespective of whether the base station includes a beam group. On the other hand, it is also possible that the plurality of SS blocks are mapped to one PRACH resource. The association mapping between the plurality of SS blocks and one PRACH resource may be intuitively understood through FIG. 5.

Association mapping 3: the SS block is associated with a different preamble index, and each preamble may be transmitted on the same or different PRACH resources. In this case, the preamble having an index different from that of the SS block may be an orthogonally coded preamble such as an orthogonal cover code. The associated mappings between the SS blocks and RA preambles with different indices may be 1:1 mappings or 1:N mappings. That is, the preamble index is predetermined and associated with the base station Rx beam direction. One SS block may be associated with one or more preamble indices (or coded preambles).

Association mapping 4: One SS block is associated with a different PRACH resource and a preamble index (or coded preamble). Therefore, the association mapping 4 may be a combination of the above-described association mappings, and there are four possible combinations of association mappings described above: 1) an association mapping between one SS block and one PRACH resource having one preamble index (or coded preamble), 2) an association mapping between one SS block and one PRACH resource with a plurality of preamble indexes (or coded preambles), 3) an association mapping between one SS block and a plurality of PRACH resources having one preamble index (or coded preamble), and 4) an association mapping between one SS block and a plurality of PRACH resources each having a plurality of preamble indices (or coded preambles).

The number of PRACH resources may be smaller than the number of Rx beams of the base station. In this case, one PRACH resource may correspond to a plurality of beam directions. However, the association mapping between the SS block and the PRACH resource (or preamble index) is independent for the relationship between the number of PRACH resources and the number of beams.

If there is no beam correspondence at the base station and the beam correspondence information is not available at the UE, beam sweeping and beam calibration are essential to accurately detect beams of the base station. The UE may also successfully connect to the network by using beam sweeping and beam calibration. The absence of beam correspondence does not mean that there is no information about the Tx beams and the Rx beams of the base station. For example, without beam correspondence, the base station may still roughly know the relationship between the Tx beam direction and the Rx beam direction of the base station. There may be partial knowledge between the Tx beam direction and the Rx beam direction of the base station. For a specific Tx beam direction, the base station may know the indexes of one or several Rx beams and the Tx beams located in the periphery of the Tx beam direction. For a specific Rx beam direction, the base station may also know the index of one or several Tx beams and the Tx beams that are in the periphery of the Rx beam direction. Here, the beam management of the UE side is not described. This is because the UE may repeatedly perform the network RA procedure by beam switching. The beam switching of the UE is an implementation issue of the UE side.

Figure 6:
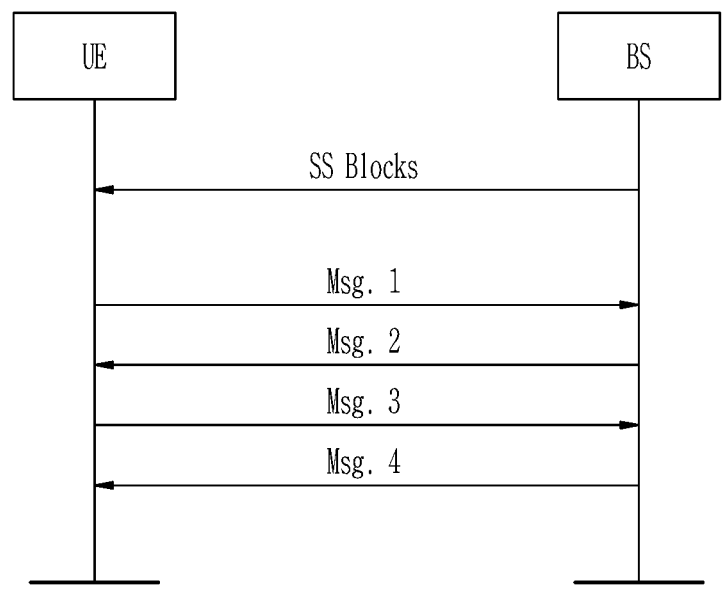
FIG. 6 is a flowchart illustrating a 4-step RA procedure of the multi-beam system according to an exemplary embodiment.

FIG. 6 is a flowchart illustrating a 4-step RA procedure of the multi-beam system according to an exemplary embodiment.

The association mappings described above may be applied to the 4-step RA procedure in FIG. 6. First, the 4 step RA procedure 1 is described.

4-Step RA Procedure 1

In the 4-step RA procedure 1, it is assumed that the total number of base station Tx beams is equal to the total number of base station Rx beams. The beam direction of the base station Tx beam may be the same as or different from the beam direction of the base station Rx beam. The association mapping 1 between the SS block and the PRACH resource may be applied to the 4-step RA procedure 1. In the 4-step RA procedure 1, the number of SS blocks is equal to the number of PRACH resources (or the number of preamble indexes), and the number of SS blocks is equal to the number of Tx beams and Rx beams of the base station.

1. SS Block Transmission at the Base Station

The base station (gNB or TRP, etc.) performs beam sweeping to transmit the SS block. Each SS block is transmitted through a TX beam of the base station, and each SS block corresponds to a different beam. Each SS block may carry a unique time index indication. The time index indication corresponds to the index information of the Tx beam of the base station. If the UE successfully detects one or more SS blocks, the UE may know the index information of the Tx beam of the base station with the time index indication of the detected SS block. The base station transmits the multiple SS blocks using the Tx beam sweeping for the Tx beam calibration.

2. Msg. 1 Transmission

The index information of the Tx beam of the base station is required for transmission of the message 2 (Msg. 2) and message 4 (Msg. 4) and downlink transmission by the base station. Therefore, the UE may feedback the index information of the Tx beam of the base station to the base station through the message 1. The association mapping 1 may be used to carry the index information of the Tx beam of the base station. That is, since the SS block detected by the UE corresponds to the information of the associated PRACH resource used by the UE to transmit the message 1, the UE may transmit the index information of the Tx beam of the base station to the base station. In this case, the base station may determine the optimal Tx beam fed back by the UE based on the information about the PRACH resource used by the UE. For example, the UE determines the PRACH resource corresponding to the detected SS block based on the mapping relationship between the SS block and the PRACH resource, and transmits the message 1 to the base station by using the determined PRACH resource. Then, the base station may determine the optimal Tx beam according to the Tx beam that is used to transmit the SS block corresponding to the PRACH resource by which the message 1 is transmitted.

Also, the message 1 may be transmitted through a plurality of PRACH resources for receive beam calibration of the base station when there is no beam correspondence of the base station. For example, after the UE detects several SS blocks, the UE may know the location of a plurality of PRACH resources for transmission of the message 1 based on the association between the predefined SS block and the PRACH resource. The number of PRACH resources used by the UE at this time may differ from the number of SS blocks detected by the UE, even if the PRACH resource is selected by the UE based on a 1:1 association mapping (the association mapping 1).

3. Message 2 (Msg. 2) Transmission

Figure 7:
FIG. 7 is a schematic diagram illustrating a mapping between a PRACH resource and an Rx beam of the base station according to an exemplary embodiment.

After successfully receiving message 1 from the UE, the base station may know the index of the optimal Tx beam for the UE based on information about the PRACH resource used by the UE. Further, since the base station performs Rx beam sweeping when receiving the message 1 in the plurality of PRACH resources, the Rx beam calibration of the base station may also be successful. In this case, one PRACH resource corresponds to one Rx beam of the base station. FIG. 7 is a schematic diagram illustrating a mapping between a PRACH resource and an Rx beam of the base station according to an exemplary embodiment. The base station may also know the optimal Rx beam for the UE since the base station searches for PRACH resources in the direction with the best performance metric. At this time, the best performance metric may be the maximum received power or the like. Thus, the base station may send message 2 to the UE through the optimal Tx beam determined based on the feedback of the UE. Note that, after successfully receiving message 1 from the UE, the Tx beam calibration and Rx beam calibration of the base station may be performed.

4. Message 3 (Msg. 3) Transmission

Since the base station has performed beam calibration on the Tx beam and the Rx beam, the message 3 transmission of the UE is identical to the message 3 transmission of the single beam system.

5. Message 4 (Msg. 4) Transmission

Since the base station has performed beam calibration on the Tx beam and the Rx beam, the transmission of the message 4 of the base station is also the same as the transmission of the message 4 of the single beam system.

Because of the multi-beam operation, in the 4-step RA procedure 1 according to the exemplary embodiment, the Rx beam calibration for the uplink of the base station and the Tx beam calibration for the downlink are required. However, considering the radio resource efficiency, the number of SS blocks in the SS burst set period may be smaller than the number of PRACH resources and the number of Tx/Rx beams of the base station.

4-Step RA Procedure 2

In a 4-step RA procedure 2 according to an exemplary embodiment, the number of Tx beams (or beam groups) of a base station is equal to or different from the number of Rx beams (or beam groups). In addition, the number of SS blocks is less than the number of the Tx beams or the number of the Rx beams of the base station. The number of PRACH resources is equal to the number of the Rx beams of the base station. The association mapping 2 described above may be applied to the 4-step RA procedure 2 according to the exemplary embodiment.

1. SS Block Transmission of Base Station

Figure 8:
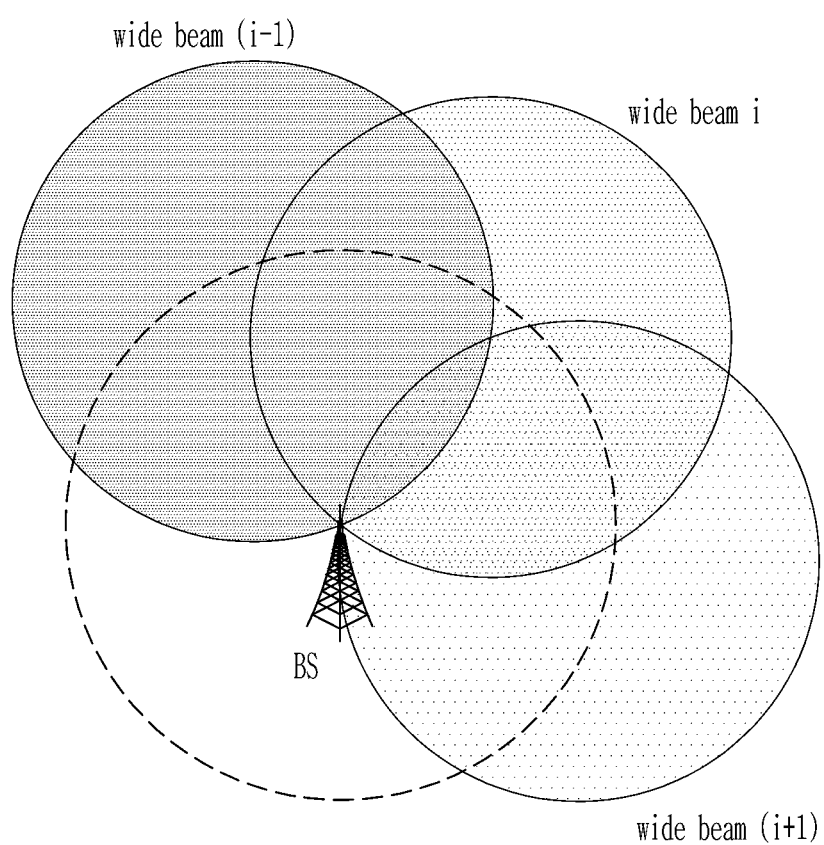
FIG. 8 is a schematic diagram illustrating wide Tx beams used to transmit the SS block according to an exemplary embodiment.

The base station transmits the SS block by performing beam sweeping. Each SS block is transmitted from the base station through a wide Tx beam, and each of the SS blocks corresponds to a different wide Tx beam. FIG. 8 is a schematic diagram illustrating wide Tx beams used to transmit the SS block according to an exemplary embodiment. According to the exemplary embodiment, wide Tx beams may be used when the number of SS blocks included in one SS burst set is relatively small. That is, when the number of SS blocks included in one SS burst set is not enough large compared to the number of narrow Tx beams, the wide Tx beam may be used for transmission of the SS blocks. The SS block carries a unique time index indication, and the time index indication corresponds to the index information of the wide Tx beam of the base station. If the UE successfully detects one or more SS blocks with the system information, the UE knows the time index indication of the SS block and also knows the index information of the wide Tx beam of the base station. The base station transmits the plurality of SS blocks through transmission beam sweeping for beam calibration of the wide transmission beam of the base station (coarse transmission beam correction).

2. Message 1 Transmission

The index information of the Tx beam of the base station is also required for the base station. Therefore, the UE may feedback the index information of the Tx beam to the base station through the message 1. The index information of the Tx beam may be fed back through the association mapping 2 described above. According to the exemplary embodiment, the base station may know information about the optimal Tx beam fed back by the UE based on information about the PRACH resources used by the UE. Further, when there is no beam correspondence at the base station, the message 1 of the UE may include the plurality of PRACH resources for the Rx beam calibration of the base station. After detecting several SS blocks, the UE may determine the location of the plurality of PRACH resources to be used for transmission of message 1 based on a predetermined association mapping between the SS block and the PRACH resources. That is, the UE transmits the message 1 through the preamble of the plurality of PRACH resources determined based on the association 3. Message 2 Transmission After successfully detecting message 1 transmitted from the UE, the base station may determine the index information of the optimal Tx beam for the UE based on the information on the PRACH resource used for transmission of the message 1. Also, since the base station performs Rx beam sweeping and receives message 1 in the plurality of PRACH resources from the UE, the base station may also successfully perform Rx beam calibration. In this case, one PRACH resource corresponds to one reception beam at the base station, as shown in FIG. 7. FIG. 7 is a schematic diagram illustrating a mapping between the PRACH resource and the Rx beam of a base station according to the exemplary embodiment. Since the base station determines the PRACH resource corresponding to the direction with the highest performance metric, the optimal Rx beam for the UE may also be determined. The best performance metric may be maximum receive power or the like. That is, the base station may roughly perform the wide Tx beam calibration and may precisely perform the Rx beam calibration. That is, message 2 may be transmitted from the base station to the UE through the optimal wide Tx beam determined based on the feedback of the UE.

4. Message 3

According to the exemplary embodiment, it is necessary to perform Tx beam calibration elaborately for the transmission of message 3 and message 4, after the beam calibration is roughly performed for the wide transmission beam of the base station. Unlike the 4-step RA procedure 1 described above, the fine Tx beam calibration may be performed based on the UE's measurement of the signaling or channel other than the SS block. For example, the fine calibration of the Tx beam of the base station may be performed based on a measurement of a signal, signaling, or channel, such as a channel state information-reference signal (CSI-RS). After the fine calibration of the Tx beam of the base station is performed, the UE reports the index information of the Tx beam of the optimal base station to the base station. A method for the UE to report the index information of the Tx beam of the base station is as follows.

The index information of the optimal Tx beams of the base station determined after the fine calibration through the additional payload included in the message 3 may be reported to the base station. Alternatively, the index information of the optimal Tx beam of the BS determined after the fine calibration may be reported to the BS through a physical uplink shared channel (PUSCH) transmitted after the RA procedure.

5. Message 4 Transmission

If the fine beam calibration for the Tx beam of the base station is performed and information about the optimal Tx beam of the base station is reported to the base station through the message 3, then the base station transmits a message 4 by using the reported Tx beam (i.e., the narrow transmit beam) to the terminal. However, if the information about the optimal Tx beam of the base station is not reported through the message 3 (i.e., reported via the PUSCH after the RA procedure), the base station reuses the wide Tx beam used for transmission of the message 2 to transmit the message 4 to the UE. At this time, the information included in the message 4 may be the same as the message 4 of the single beam system.

4-Step RA Procedure 3

Figure 9:
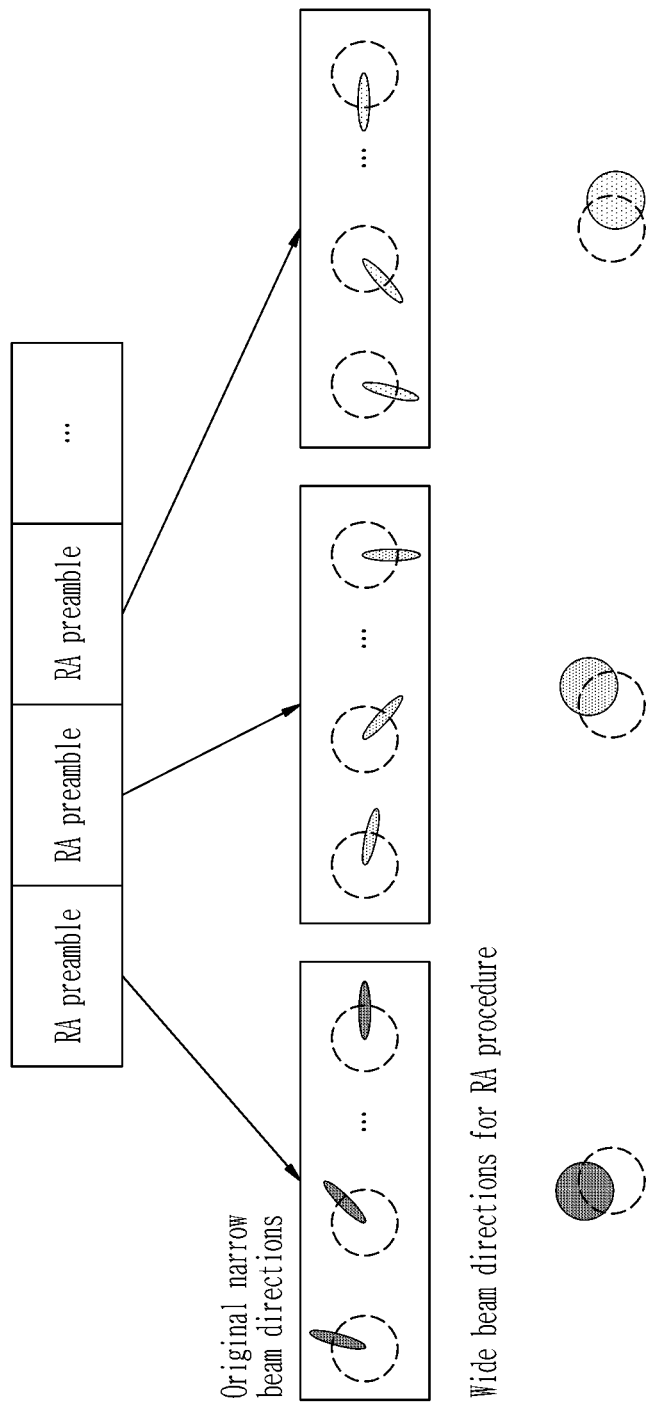
FIG. 9 is a schematic diagram illustrating a mapping between the PRACH resource and the Rx beam of the base station according to another embodiment.

The 4-step RA procedure 3 according to an exemplary embodiment is for a case where the number of PRACH resources is smaller than the number of Rx beams of the base station. At this time, the coarse beam calibration and the fine beam calibration are necessary for both the Tx beam and the Rx beam of the base station. FIG. 9 shows the mapping between the PRACH resource and the Rx beam of the base station applied in the 4-step RA procedure 3. FIG. 9 is a schematic diagram illustrating a mapping between the PRACH resource and the Rx beam of the base station according to another embodiment. Referring to FIG. 9, since the number of available PRACH resources cannot cover all the Rx beams (i.e., narrow receive beam) direction of the base station, the wide Rx beam may be used during the RA procedure for coarse beam calibration. If a wide beam is used in the RA procedure, it can save radio resources and also reduce the delay of the RA procedure. However, prior to performing the general communication after the RA procedure, the fine beam calibration is required for the Tx beams and the Rx beams of the base station. In a 4-step RA procedure 3 according to the exemplary embodiment, all of the SS blocks and the RA messages are transmitted and received through the wide Tx beam and the wide Rx beam, and the fine beam calibration is performed prior to general data communication after the RA procedure. At this time, the number of the Tx beams and the Rx beams may be different from the beam width.

In the following description, a case where the number of SS blocks and the number of PRACH resources are smaller than the number of the Tx beams and the Rx beams of the base station is described. In that case, the RA procedure may be performed by using beams in the beam group.

4-Step RA Procedure 4

The 4-step RA procedure 4 according to an exemplary embodiment is for a case where the number of SS blocks is smaller than the number of the Tx beams of the base station and/or the number of the PRACH resources is smaller than the number of the Rx beams of the base station. In this case, in view of association mappings 1 and 2, a 4-step RA procedure 4 may be implemented for each beam group. For example, the number of SS blocks may be less than the number of the Tx beams of the base station, but may be equal to the number of beams in the beam group. In this case, the RA procedure may be performed on a beam group basis.

Figure 10:
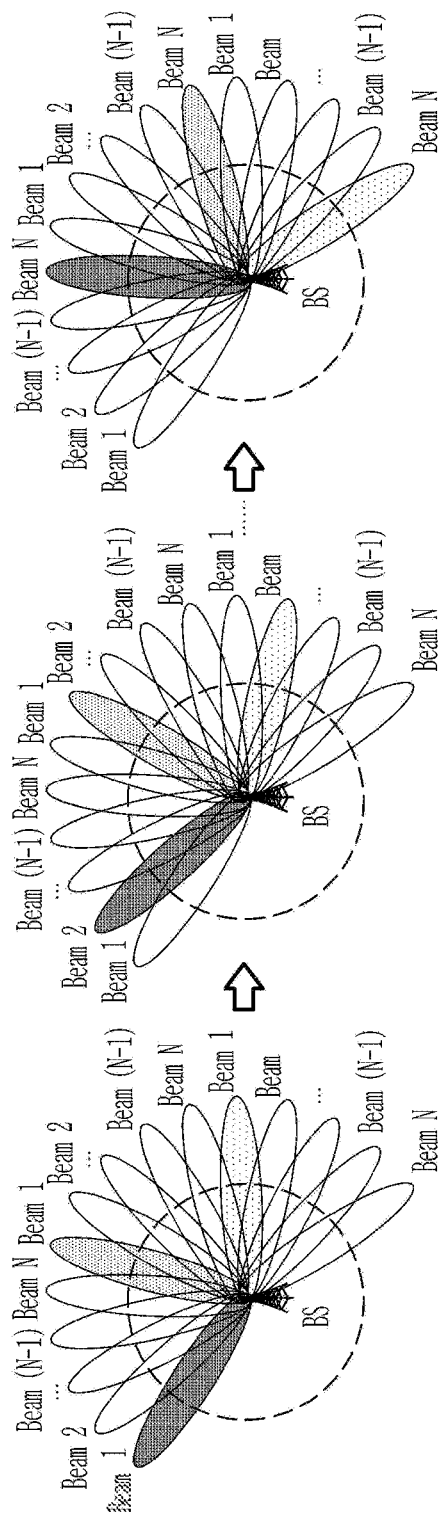
FIG. 10 is a schematic diagram illustrating an RA procedure performed in parallel through the plurality of the beam groups according to an exemplary embodiment.

That is, a plurality of RA procedures may be performed simultaneously in parallel through the plurality of the beam groups. FIG. 10 is a schematic diagram illustrating an RA procedure performed in parallel through the plurality of the beam groups according to an exemplary embodiment. Referring to FIG. 10, the SS blocks and the PRACH resources may be reused in different beam groups due to the degrees of freedom of the spatial domain. That is, when N beams are included in each beam group, the SS block and the PRACH resource may be transmitted and received through the beam of the same index at one time point. For example, beam 1 is used in each beam group at time 1, beam 2 of each beam group is used at time 2, and beam N of each beam group is used at time N. The 4-step RA procedures 1, 2, and 3 described above may also be performed on a beam group basis.

If the number of the SS blocks and the number of the PRACH resources are smaller than the number of the Tx beams and the Rx beams of the base station, the messages 2 and 4 may be transmitted through the beam sweeping for fine calibration of the Tx beam of the base station.

4-Step RA Procedure 5

The 4-step 4 RA Procedure 5 is similar to 4-step RA Procedures 1, 2, 3, and 4 in terms of association mappings 1 and 2 described above. In the 4-step RA procedure 5, the messages 2 and 4 may be transmitted by using the beam sweeping for the fine calibration of the Tx beam of the base station. Correspondingly, the index information about the fine transmission beam may be reported to the base station via the additional payload or the PUSCH of the message 3.

The association mappings 1 and 2 may be applied to the above-described 4-step RA procedure. That is, in the 4-step RA procedures 1, 2, 3, 4, and 5, the PRACH resource is mapped to the Rx beam of the base station in the time and frequency domain. However, in association mappings 3 and 4, a preamble (or coded preamble) may be mapped to the Rx beam of the base station in the time and frequency domain. In the following, the 4-step RA procedure 6 and the 4-step RA procedure 7, to which the association mapping 3 and 4 may be applied, are described in detail.

4-Step RA procedure 6

In the association mapping 3, the SS block is mapped to one or more preambles (or coded preambles). Different SS blocks may be mapped to different preambles (or coded preambles). All UEs may transmit the message 1 through all available PRACH resources using the preamble (or coded preamble) mapped to the detected SS block. The contention between each UE (i.e., collisions that may occur when transmitting a preamble through all PRACH resources) may be resolved by using different orthogonal preambles (or coded preambles). The base station may determine the optimal Tx beam based on the preamble received from the UE. At this time, the optimal Tx beam may be a narrow beam if the number of SS blocks is sufficient to correspond to all transmission beams, or may be a wide beam if the number of SS blocks is limited. The transmission and reception of the messages 2 to 4 are the same as the 4-step RA procedures 1 to 5 described above. In step 4 RA procedure 6, the PRACH resource efficiency may be higher due to the degree of freedom in the code domain in the message 1 transmission.

4-Step RA Procedure 7

In association mapping 4, one SS block is all mapped with a preamble (or coded preamble) and a PRACH resource. Since the message 1 is not transmitted using all the PRACH resources, it may be different from the format of message 1 of the 4-step RA procedure 6. That is, in the 4-step RA procedure 7, each UE may transmit the message including the preamble (or coded preamble) mapped to the detected SS block 1 through the PRACH resource mapped with the detected SS block. The transmission and reception of the messages 2 to 4 are the same as the 4-step RA procedures 1 to 5 described above.

The terms used below follow the definition of 3GPP NR and the NR-related reports and specifications published by 3GPP. The single beam operation is treated as a special case of the multi-beam operation, and the contents of this disclosure may all be simply applied to the single beam operation. The multi-beam operation is described below as an example.

Table 1 below illustrates use cases of the PRACH in 3GPP NR. The NR-PRACH according to an exemplary embodiment may be applied, in addition, to the example shown in Table 1, but is not limited thereto.

TABLE 1

| use cases | IDLE mode | INAC-TIVE mode | CON-NECTED mode | Contention-based | Contention-free |
|---|---|---|---|---|---|
| IA/Paging | ○ | | | ○ | |
| HO | | | ○ | | ○ |
| ODSI request | ○ | ○ | | ○ | |
| BFR request | | | ○ | | ○ |
| Others | | | | | |

Figure 11:
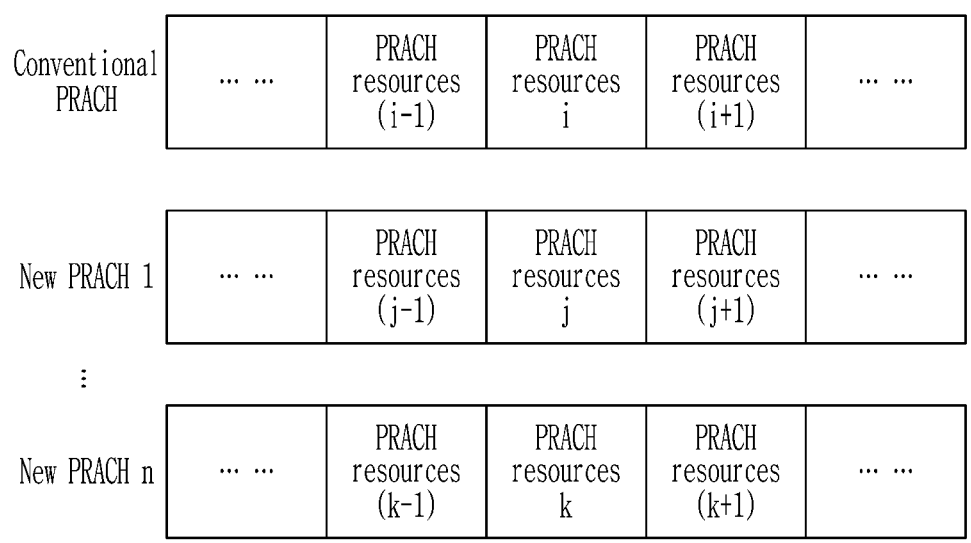
FIG. 11 is a schematic diagram illustrating a basic PRACH structure according to an exemplary embodiment.

FIG. 11 is a schematic diagram illustrating a basic PRACH structure according to an exemplary embodiment.

In addition to the conventional PRACH, n new channels may orthogonally coexist with the conventional PRACH. Note that the new channel may have a different name from the PRACH and has similar functionality to the conventional PRACH. In the following, a new channel coexisting with the conventional PRACH is called a new PRACH. The orthogonality between the conventional PRACH and the new PRACH means that the two channels are located on an orthogonal radio resource (time, frequency, code, space, power domain, etc.). The time length of multiple PRACHs in the time domain and the bandwidth in the frequency domain may be different. Since all PRACHs can be commonly used by a plurality of UEs, the same numerology may be maintained for the PRACHs on carrier frequency including subcarrier spacing and symbol length. However, the numerology of the PRACHs located in a different frequency range may be different. Since there are various PRACHs and there are various use cases, the following describes some mappings between the use case and the PRACH based on the use case where the conventional PRACH is applied to the initial access and paging.

FIG. 12 is a schematic diagram illustrating a mapping between a same new PRACH and a use case according to an exemplary embodiment, FIG. 13 is a schematic diagram illustrating a mapping between a use case and a new PRACH different from each other according to an exemplary embodiment, and FIG. 14 is a schematic diagram illustrating a new PRACH according to an exemplary embodiment.

Use Case to PRACH Mapping 1

The mapping method is basically a dynamic and mixed mapping method. That is, except for the basic mapping in which the PRACH is mapped to the initial connection and the paging, all the other use cases may be freely mapped to a plurality of PRACH. Note that a plurality of use cases may share the same PRACH, or a PRACH unique to the use case may exist.

Use Case to PRACH Mapping 2

All PRACH use cases are categorized into two categories. Category 1 includes conventional use cases of PRACH (i.e., initial access, paging, and handover). Thus, the use case of Category 1 may be mapped to the conventional PRACH. All other new use cases belong to Category 2. Use cases in this category may be mapped to a single or multiple new PRACHs. In FIG. 13, the ODSI request may be mapped to the new PRACH 1 and the BFR request may be mapped to the new PRACH 2. If there are more new use cases, the new use case may be mapped to the new PRACH in the same way as in FIGS. 12 and 13.

Use Case Mapping Between and PRACH 3

All PRACH use cases can be categorized into two categories based on different criteria. In the use case of Category 1, a contention-based 4-step RA procedure is used by UEs in idle mode or in inactive mode. The use cases of Category 1 include initial connection, paging, and ODSI requests. In the use case of category 2, a contention-based 2-step RA procedure is used by the UE in the connected mode. Use cases of category 2 include handover and BFR requests. The PRACH mapping shown in FIG. 14 is different from the PRACH definition of the conventional system. The two PRACHs shown in FIG. 14 are referred to as a new PRACH. If there are more new use cases, the new use cases may be classified into two categories according to the same classification criteria as the UE's RRC mode.

Hereinafter, the PRACH association relation for the PRACH according to an exemplary embodiment will be described in detail.

In the 3GPP NR system, an association mapping between the SS block and the PRACH resource has been agreed for UEs in idle mode. In addition, association mapping between the CSI-RS and the PRACH resources is also being studied for UEs in a connected mode. The association mappings for the above two cases are shown in FIGS. 12-14. In the mapping 1 and 2 between the use case and the PRACH described above, there may be a cross association among PRACHs since the use cases are categorized based on their novelty. In the association mapping 3 between the use case and the PRACH, the use cases are categorized on the basis of the RRC mode of the UE, so there is no cross association between the PRACHs.

In the association between the SS block and the PRACH, the association indication information may be carried by a demodulation reference signal (DMRS) for a physical broadcast channel (PBCH). That is, for initial access, paging, and ODSI requests, the UE may determine a subset of the PRACH resources that may be used for transmission of message 1 of the RA procedure based on the association of the SS block and the PRACH. The association information indicating which PRACH resources would be used may be implicitly carried by the PBCH-DMRS. For example, different sequences for generating PBCH-DMRS may carry the association information. Alternatively, different orthogonal cover codes or different sequences for scrambling the PBCH-DMRS may be used to carry the association information. Note that in the RA procedure, the contention-based RA procedure uses four messages, and the contention-free RA procedure uses two messages. The message m in the RA procedure indicates the m-th message in the RA procedure. Note that the PBCH-DMRS is not only limited to carry the association information, but also may be used to carry other types of information, such as a time index indication of the SS block, all or part of a system frame number (SFN), etc. The PBCH-DMRS according to an exemplary embodiment of the present disclosure may indicate that it may be used to carry information, and possible methods of carrying information by PBCH-DMRS are proposed.

In the association between the CSI-RS and the PRACH, a sequence generating a CSI-RS or a grouping of OCC coded sequences or scrambled sequences may be used to carry association indication information.

Grouping of Sequences for Generating the CSI-RS

All available sequences for generating CSI-RSs may be grouped into a plurality of groups. Each group may correspond to a network configuration which may include one or more of an assigned sequence for generating the message 1, an indication of an OCC code for coding the messages 1 sequence(s), an indication of a sequence(s) for scrambling the message 1, a subset of the PRACH resources, and an RA preamble format. The UE may then detect the CSI-RS to determine the network configuration for the message and determine the sequence group corresponding to the network configuration.

OCC Coded Sequences for Generating the CSI-RS

Different OCCs may be used to code sequences that generate CSI-RSs. Each OCC may correspond to a network configuration which may include at least one of an assigned sequence for generating the message 1, an indication of an OCC code for coding the messages 1 sequence(s), an indication of a sequence(s) for scrambling the message 1, a subset of the PRACH resources, and an RA preamble format. The UE may then detect the CSI-RS to determine the network configuration for the message 1 and determine the OCC corresponding to the network configuration.

Scrambled Sequences for Generating the CSI-RS

Different scrambling sequences may be used to scramble the sequence for generating the CSI-RS. Each scrambling sequence may correspond to a network configuration which may include at least one of an assigned sequence for generating the message 1, an indication of an OCC code for coding a sequence of messages 1, an indication of a sequence for scrambling the message 1, a subset of the PRACH resources, an RA preamble format. The UE may then detect the CSI-RS to determine the network configuration for the message 1 and determine the scrambling sequence corresponding to the network configuration.

Below is a message 1 for a new PRACH use case.

Message 1 for ODSI Request

When sending a message 1 for the ODSI request, a Zadoff-Chu (ZC) sequence or other type of sequences may be used to generate message 1. At this time, the message 1 is similar to message 1 of the conventional PRACH use case such as initial connection, paging, or handover. To request different SI blocks (SIBs), different dedicated sequences may be reserved. When there are a total number of X SIBs requested to the UE based on the request (that is, their demand), X different sequences may be reserved, and each sequence corresponds to a SIB. Therefore, the base station may detect the message 1 for the ODSI request and determine the SIB requested by a particular UE. Alternatively a method of using a reserved sequence, or a reserved OCC code, or a scrambling sequence may be applied to code or scramble the message 1 to inform the base station of the requested SIB. At this time, using the reserved sequence or the reserved OCC code, or the scrambling sequence may operate in a manner similar to the CSI-RS carrying the association indication information, as described above.

Message 1 for BFR Request

In the use case of the BFR request, the information carried by a message 1 includes at least a UE identifier. This information may inform the base station which connection mode UE is requesting the BFR. In consideration of compatibility with the conventional PRACH, a sequence such as a ZC sequence may be transmitted to generate the message 1 for the BFR request. Referring to FIG. 15, there are two alternatives to carry the UE identifiers by the message 1. FIG. 15 is a schematic diagram illustrating a message 1 format including 3 PRACH resources for BFR request according to an exemplary embodiment.

1. Implicit way: Sequences are used to generate message 1 in this way. The CSI-RS described above may also carry information by a sequence(s). That is, the UE identifiers may be carried by using grouping of sequences, OCC coded sequences, or scrambled sequences which are used to produce the message 1. Referring to FIG. 15, the PRACH resources are configured in a continuous sequence, and the UE identifier may be carried by a grouping of sequences, an OCC coded sequence, or a scrambled sequence.

2. Explicit way: The UE identifier may be explicitly carried through a payload added after the sequence which is used for generating message 1. At this time, the format of the message 1 is a sequence to which the payload is added. Referring to FIG. 15, the UE identifier may be carried through the payload that follows the sequence.

Note that both the implicit way and explicit way for carrying the UE identifiers may be described by occupying single PRACH resource. In case of the Rx beam sweeping of the base station for Rx beam calibration, the UE may use multiple PRACH resources to transmit the message 1. That is, in the implicit way, the same sequence may be repeated several times for the beam sweeping on successive PRACH resources. It is also possible to use different sequences for the beam sweeping on the successive PRACH resources. In the explicit way, the same or different sequences, with the same payload appended, may be transmitted on several successive PRACH resources for the beam sweeping.

In case of a downlink (DL) beam failure, after the UE detects the beam failure, the UE may send the BFR request including not only the UE identifier but also some other information such as information about the candidate Tx beam of the base station. The CSI-RS based association described above may be used to report information about the candidate Tx beam of the base station through the network configuration for transmission of the message 1. That is, a sequence, an OCC code, a scrambling sequence, or a subset of PRACH resources configured by the network may be used to report information about the candidate Tx beams of the base station. Other information that may be carried by the message 1 to transmit the BFR request may also be transmitted in this manner.

Meanwhile, a new PRACH may be retransmitted. The new PRACH retransmission method includes two alternatives. In alternative 1, power ramping may be applied for retransmission of the message 1. In alternative 2, along with power ramping, more PRACH resources may be occupied for retransmission of the message 1. If more PRACH resources are occupied, the Rx beam sweeping and the beam calibration performance at the base station may be improved.

Figure 16:
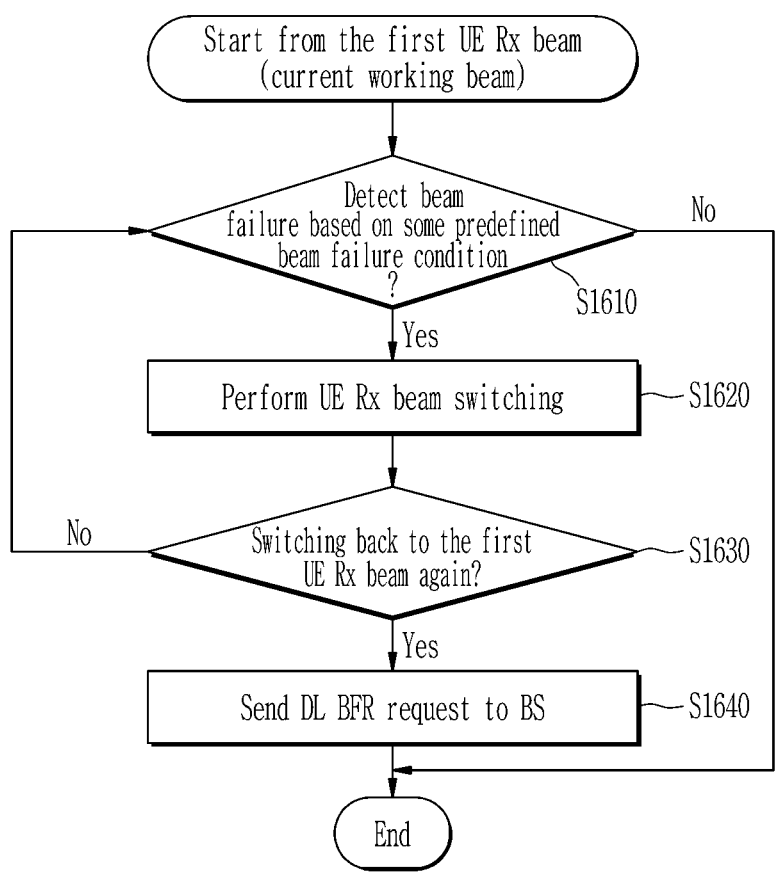
FIG. 16 is a flowchart illustrating a method of the BFR request of the UE according to an exemplary embodiment.
Figure 17:
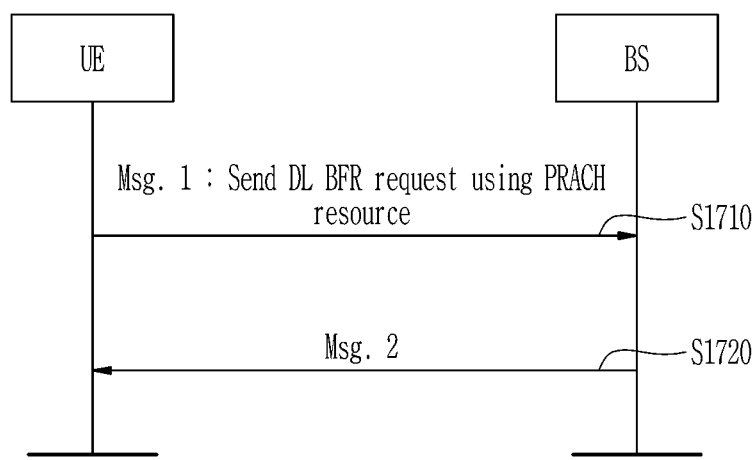
FIG. 17 is a flowchart illustrating a 2-step RA procedure for a DL BFR request according to an exemplary embodiment.

The procedure for triggering the BFR request will be described below with reference to FIGS. 16 and 17. FIG. 16 is a flowchart illustrating a method of the BFR request of the UE according to an exemplary embodiment, and FIG. 17 is a flowchart illustrating a 2-step RA procedure for a DL BFR request according to an exemplary embodiment.

Since the beam failure is detected by the receiving end, the procedure for measuring the downlink beam failure and the procedure for measuring the uplink beam failure may be different. In the following, it is assumed that the beam of a single link fails and the beam of a dual link fails.

DL beam failure only: In the measurement of the DL beam failure, the UE's receiver detects the beam failure. At this time, since the Tx beam of the base station may cover a wider area and may be dynamically controlled by the base station, the DL beam failure may be likely due to a mismatch of the Rx beam of the UE. Therefore, if the UE detects the DL beam failure in the first UE Rx beam (current operation beam) based on the predefined beam failure condition (S1610), the UE first switches to the next beam (The beam adjacent to the first beam) from the first beam (S1620). And the UE measures the link quality for the next beam before transmitting the DL BFR request. Once the DL beam failure is also measured, the Rx beam switching is performed on the beam adjacent to the next beam and the link quality is measured. If the beam failure is measured for all Rx beams (S1630), the UE transmits the DL BFR request to the base station (S1640). Although it may take a lot of time to transmit the BFR request in the procedure according to FIG. 16, the time required to transmit the BFR request is not long when the number of the beams of the UE is not large. The format of the message 1 including the DL BFR request may not occupy the large number of the PRACH resources when the Tx beam of the base station is informed to the base station through the message 1. Thus, the information about the candidate Tx beam of the base station may also be carried from the message 1. Referring to FIG. 17, the UE transmits a message 1 including a DL BFR request through a single PRACH resource (S1710), and the base station transmits a response to the message 1 through the message 2 to the UE (S1720).

Figure 18:
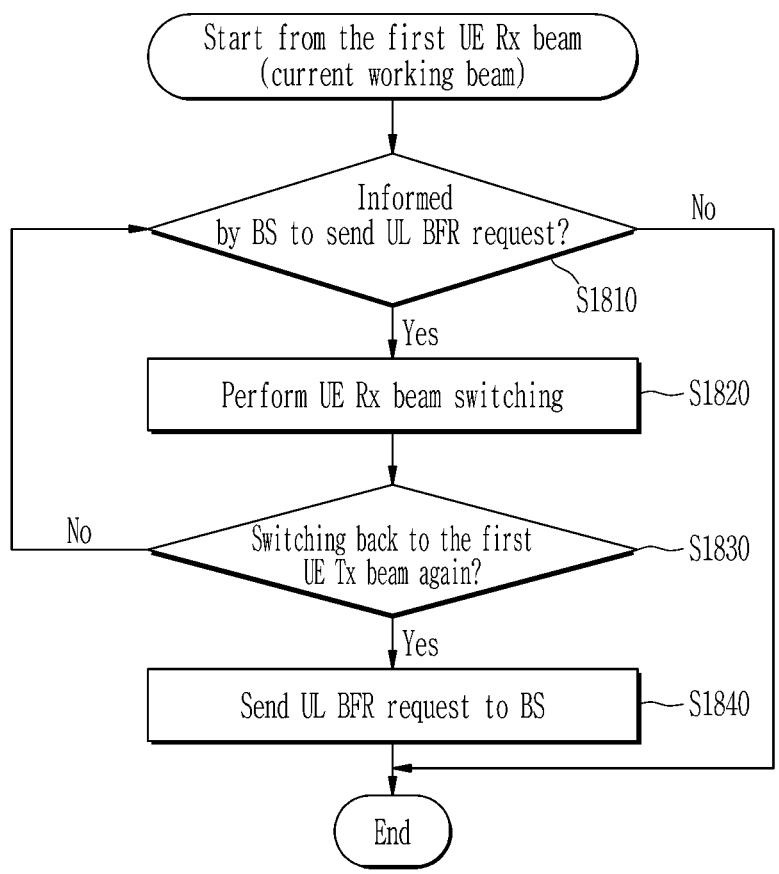
FIG. 18 is a flowchart illustrating a UE transmission operation before the UL BFR request of the UE according to an exemplary embodiment.
Figure 19:
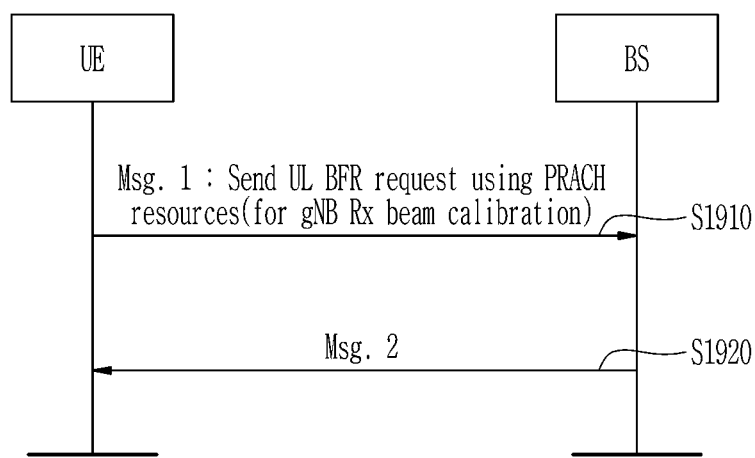
FIG. 19 is a flowchart illustrating a 2-step RA procedure for an UL BFR request according to an exemplary embodiment.

UL beam failure only: In the measurement of the UL beam failure, the receiver of the base station may detect the beam failure. FIG. 18 is a flowchart illustrating a UE transmission operation before the UL BFR request of the UE according to an exemplary embodiment, and FIG. 19 is a flowchart illustrating a 2-step RA procedure for an UL BFR request according to an exemplary embodiment. When the receiver of the base station detects a beam failure (S1810), the base station informs the UE that a Tx beam failure has been detected, and the UL BFR request is transmitted by the UE for beam failure recovery. Before transmitting the UL BFR request, the UE performs Tx beam switching of the UE (S1820). Since the power consumed by the base station is higher and the base station controls the Rx beam direction of the base station based on the UL measurement. The UE switches the transmit beam and hears information for transmitting the BFR request from the station. When the information is received in all base station Tx beam directions (S1830), the UE transmits the UL BFR request to the base station (S1840). Referring to FIG. 19, in a two-step RA procedure for the UL BFR request, the UE transmits the message 1 including the uplink BFR request to the base station by using the plurality of PRACH resources (S1910). At this time, since the message 1 is transmitted through a plurality of PRACH resources, the base station may perform the Rx beam calibration. The base station transmits a response to the message 1 to the UE through the message 2 (S1920).

Simultaneous UL and DL beam failures: If both DL beam failure and UL beam failure occur simultaneously, since the UE cannot receive information on the uplink beam failure from the base station, a recovery procedure of the DL beam failure is performed. At this time, the optimal message 1 for the BFR request includes at least the UE identifier and may further include other information such as information on the candidate Tx beam of the base station for DL beam calibration of the base station. The message 1 may occupy a plurality of new PRACH resources for UL Rx beam calibration of the base station.

Figure 20:
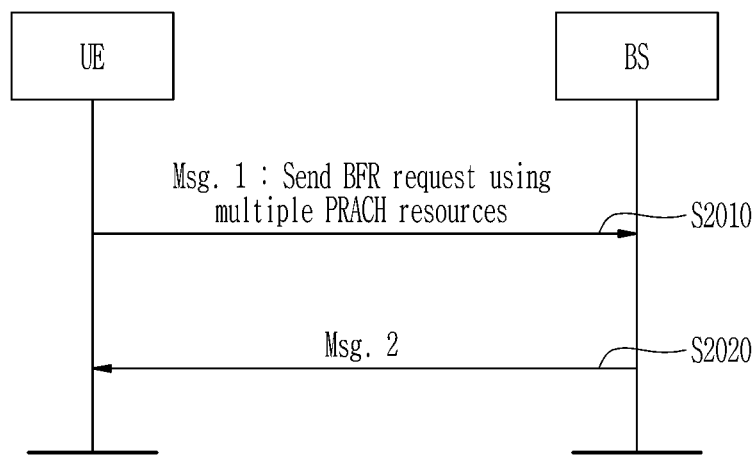
FIG. 20 is a flowchart illustrating a unified RA procedure for a BFR request in accordance with an exemplary embodiment.

If the above three scenarios are jointly supported by a single RA procedure for a BFR request, a 2-step unified RA procedure as shown in FIG. 20 may be performed. FIG. 20 is a flowchart illustrating a unified RA procedure for a BFR request in accordance with an exemplary embodiment. In FIG. 20, the UE occupies a plurality of new PRACH resources and transmits the message 1 for the DL BFR request and the UL BFR request (S2010). For the D BFR request and the UL BFR request, a payload may be added to the message 1 depending on whether the UE identifier and other information need to be carried further. The base station transmits the message 2 in response to message 1 (S2020). The message 2 may be used to inform the UE whether the message 1 has been successfully decoded. Other information may also be carried to the UE through the message 2. A radio link failure (RLF) may be recognized by the system if the timer for the counting timing of the beam failure exceeds a predetermined time value.

Figure 21:
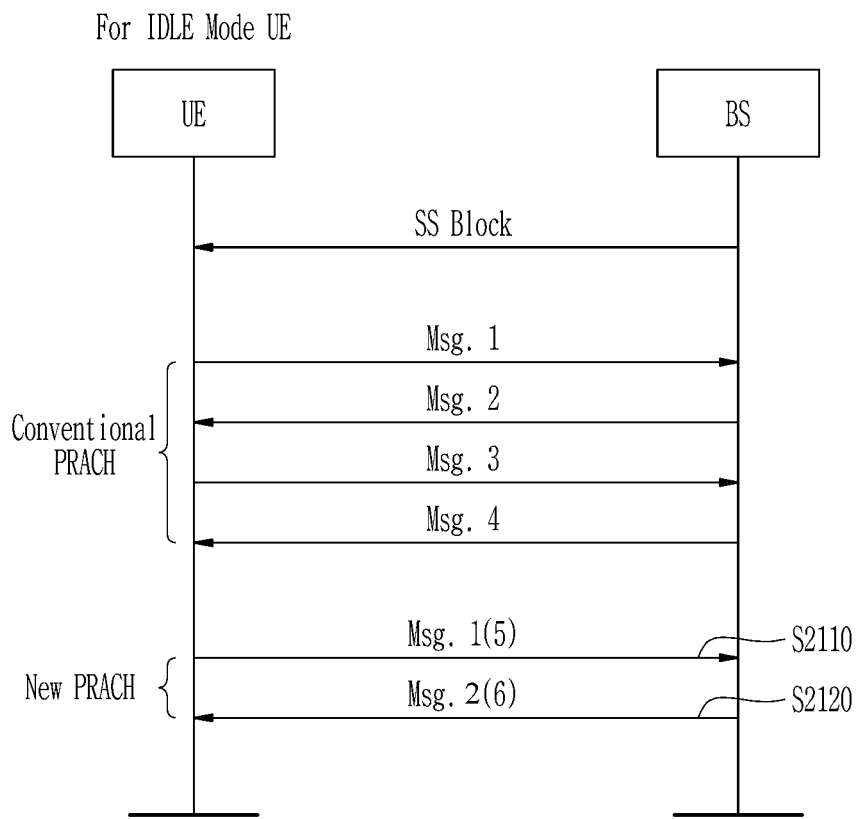
FIG. 21 is a flowchart illustrating an RA procedure for a 2-step beam calibration according to an exemplary embodiment.

FIG. 21 is a flowchart illustrating an RA procedure for a 2-step beam calibration according to an exemplary embodiment.

Considering the tradeoff between resource efficiency and number of beams, all available number of SS blocks and PRACH resources may be less than the number of beams at the base station side. Therefore, the base station needs to perform beam calibration through a 2-step procedure for the Tx beam and the Rx beam. That is, a coarse beam calibration and a fine beam calibration may be performed. According to an exemplary embodiment, the coarse beam calibration may be performed first, and then the fine beam calibration may be performed.

Since there are multiple PRACH resources, a joint RA procedure using multiple PRACH resources might be possible. In the joint RA procedures, coarse beam calibration may be performed using conventional PRACH. That is, the wide Tx beam and the wide Rx beam of the base station are calibrated during the 4-step RA procedure based on the conventional PRACH to achieve resource efficiency for a large number of high frequency bands such as millimeter wave (mmWave). For the fine beam calibration, a new PRACH for the uplink BFR request may be used. Therefore, the new RA procedure in which the coarse beam calibration and the fine beam calibration are performed may be a 6-step RA procedure. Referring to FIG. 21, after the coarse beam calibration based on the conventional PRACH, the UE needs to inform the base station of the optimal Tx beam, and the base station needs to know the optimal Rx beam of the base station. For the fine beam calibration, the UE detects the CSI-RS and determines the optimal Tx beam of the base station based on information carried by the CSI-RS (or a network configuration based on the association mapping). Thereafter, the UE informs the base station of the information on the optimal Tx beam through the transmission of the message 5 (S2110). The message 5 corresponds to message 1 of the BFR request transmission. For the fine Rx beam calibration, the message 5 may occupy a plurality of new PRACH resources. Since the new PRACH use case for the BFR request is contention-based, the message 6 transmitted by the base station to the UE may include information that at least informs whether message 5 has been successfully decoded (S2120). At this time, the message 6 corresponds to the message 2 of the BFR request transmission.

As described above, according to the exemplary embodiments, a random access method suitable for a multi-beam system can be provided based on an association mapping between a synchronization signal block and a PRACH resource or an association mapping between a synchronization signal block and a preamble index.

Figure 22:
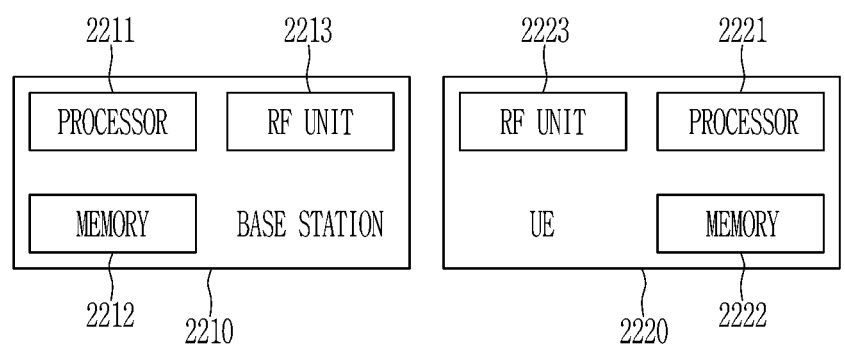
FIG. 22 is a block diagram illustrating a wireless communication system according to an exemplary embodiment.

FIG. 22 is a block diagram illustrating a wireless communication system according to an exemplary embodiment.

Referring to FIG. 22, a wireless communication system according to an exemplary embodiment includes a base station (BS) 2210 and user equipment (UE) 2220.

The BS 2210 includes a processor 2211, a memory 2212, and a radio frequency unit (RF unit) 2213. The memory 2212 may be connected to the processor 2211 to store various pieces of information for driving the processor 2211 or at least one program executed by the processor 2211. The radio frequency unit 2213 may be connected to the processor 2211 to transmit/receive a wireless signal. The processor 2211 may implement functions, processes, or methods proposed by the exemplary embodiment. In this case, in the wireless communication system according to the exemplary embodiment, a wireless interface protocol layer may be implemented by the processor 2211. An operation of the BS 2210 according to the exemplary embodiment may be implemented by the processor 2211.

The UE 2220 includes a processor 2221, a memory 2222, and a radio frequency unit (RF unit) 2223. The memory 2222 may be connected to the processor 2221 to store various pieces of information for driving the processor 2221 or at least one program executed by the processor 2221. The radio frequency unit 2223 may be connected to the processor 2221 to transmit/receive a wireless signal. The processor 2221 may implement functions, processes, or methods proposed by the exemplary embodiment. In this case, in the wireless communication system according to the exemplary embodiment, a wireless interface protocol layer may be implemented by the processor 2221. An operation of the UE 2220 according to the exemplary embodiment may be implemented by the processor 2221.

According to the exemplary embodiment of the present disclosure, the memory may be positioned inside or outside the processor and the memory may be connected to the processor through already known various means. The memory may be various types of volatile or non-volatile storage media. For example, the memory may include a read-only memory (ROM) or a random access memory (RAM). While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims.

What is claimed is:

1. An operation method of a base station in a communication system, the operation method comprising:

transmitting, to user equipment (UE), a plurality of synchronization signal (SS) blocks using a first set of beams;

receiving, from the UE, a first message 1 of a first random access (RA) procedure through a first physical random access channel (PRACH) resource;

determining a first beam from the first set of beams based on a first association mapping between the plurality of SS blocks and the first PRACH resource;

transmitting, to the UE, a first message 2 of the first RA procedure using the first beam;

transmitting, to the UE, a plurality of channel state information-reference signals (CSI-RSs) using a second set of beams;

receiving, from the UE, a second message 1 of a second RA procedure through a second PRACH resource;

identifying a first CSI-RS mapped to the second PRACH resource among the plurality of CSI-RSs based on a second association mapping between the plurality of CSI-RSs and PRACH resources;

determining a downlink (DL) beam used for transmitting the first CSI-RS as a second beam belonging to the second set of beams; and transmitting, to the UE, a second message 2 of the second RA procedure using the second beam.

2. The operation method of claim 1, wherein the receiving the first message 1 comprises calibrating a reception beam of the base station after successfully receiving the first message 1 by performing reception beam sweeping.

3. The operation method of claim 1, wherein a first width of the first beam belonging to the first set of beams is different from a second width of the second beam belonging to the second set of beams.

4. The operation method of claim 1, further comprising:
receiving, from the UE, a first message 3 of the first RA procedure after transmitting the first message 2; and
transmitting, to the UE, a first message 4 of the first RA procedure using the first beam.

5. The operation method of claim 1, wherein each of the plurality of SS blocks includes a time index indication corresponding to each beam belonging to the first set of beams.

6. The operation method of claim 1, wherein each of the plurality of SS blocks is mapped 1:1 with a PRACH resource in the first association mapping.

7. The operation method of claim 1, wherein each of the plurality of SS blocks is mapped with a plurality of PRACH resources in the first association mapping.

8. An operation method of a user equipment (UE) in a communication system, the operation method comprising:
receiving, from a base station, a plurality of synchronization signal (SS) blocks through a first set of beams of the base station;
determining a first physical random access channel (PRACH) resource through which a first message 1 of a first random access (RA) procedure is transmitted based on information about a first association mapping between the plurality of SS blocks and PRACH resources;
transmitting, to the base station, the first message 1 using the first PRACH resource;
receiving, from the base station, a first message 2 through a first beam which is determined from the first set of beams;
receiving, from the base station, a plurality of channel state information-reference signals (CSI-RSs) through a second set of beams;
determining a second PRACH resource through which a second message 1 of a second RA procedure is transmitted based on information about a second association mapping between the plurality of CSI-RSs and PRACH resources;
transmitting, to the base station, the second message 1 using the second PRACH resource; and
receiving, from the base station, a second message 2 of the second RA procedure through a second beam which is determined from the second set of beams, wherein the second PRACH resource is mapped to a first CSI-RS among the plurality of CSI-RSs, and a downlink (DL) beam used for transmitting the first CSI-RS is determined as the second beam.

9. The operation method of claim 8, wherein a first width of the first beam belonging to the first set of beams is different from a second width of the second beam belonging to the second set of beams.

10. The operation method of claim 8, further comprising determining index information of a transmission beam of the base station based on a time index indication included in each of the plurality of SS blocks.

11. The operation method of claim 8, wherein each of the plurality of SS blocks is mapped 1:1 with a PRACH resource in the first association mapping.

12. The operation method of claim 8, wherein each of the plurality of SS blocks is mapped with a plurality of PRACH resources in the first association mapping.

13. An operation method of a base station in a communication system, the operation method comprising:
transmitting, to a user equipment (UE), a plurality of synchronization signal (SS) blocks using a first set of beams;
receiving, from the UE, a first message 1 of a first random access (RA) procedure through a first physical random access channel (PRACH);
identifying a first SS block mapped to a first index of a first preamble included in the first message 1 among the plurality of SS blocks based on a first association mapping between the plurality of SS blocks and preamble indices;
determining a first downlink (DL) beam used for transmitting the first SS block as a first beam belonging to the first set of beams;
transmitting, to the UE, a first message 2 of the first RA procedure using the first beam;
transmitting, to the UE, a plurality of channel state information-reference signals (CSI-RSs) using a second set of beams;
receiving, from the UE, a second message 1 of a second RA procedure through a second PRACH;
identifying a first CSI-RS mapped to a second index of a second preamble included in the second message 1 among the plurality of CSI-RSs based on a second association mapping between the plurality of CSI-RSs and preamble indices;
determining a second downlink (DL) beam used for transmitting the first CSI-RS as a second beam belonging to the second set of beams; and
transmitting, to the UE, a second message 2 of the second RA procedure using the second beam.

14. The operation method of claim 13, wherein each of the first preamble and the second preamble is transmitted through a same physical random access channel (PRACH) resource or different PRACH resources.

15. The operation method of claim 13, wherein each of the first preamble and the second preamble is transmitted through all available physical random access channel (PRACH) resources.

16. The operation method of claim 13, wherein each of the first preamble and the second preamble is an orthogonally coded preamble.

17. The operation method of claim 13, wherein a first width of the first beam belonging to the first set of beams is different from a second width of the second beam belonging to the second set of beams.

* * * * *